United States Patent Office 3,315,243
Patented Apr. 18, 1967

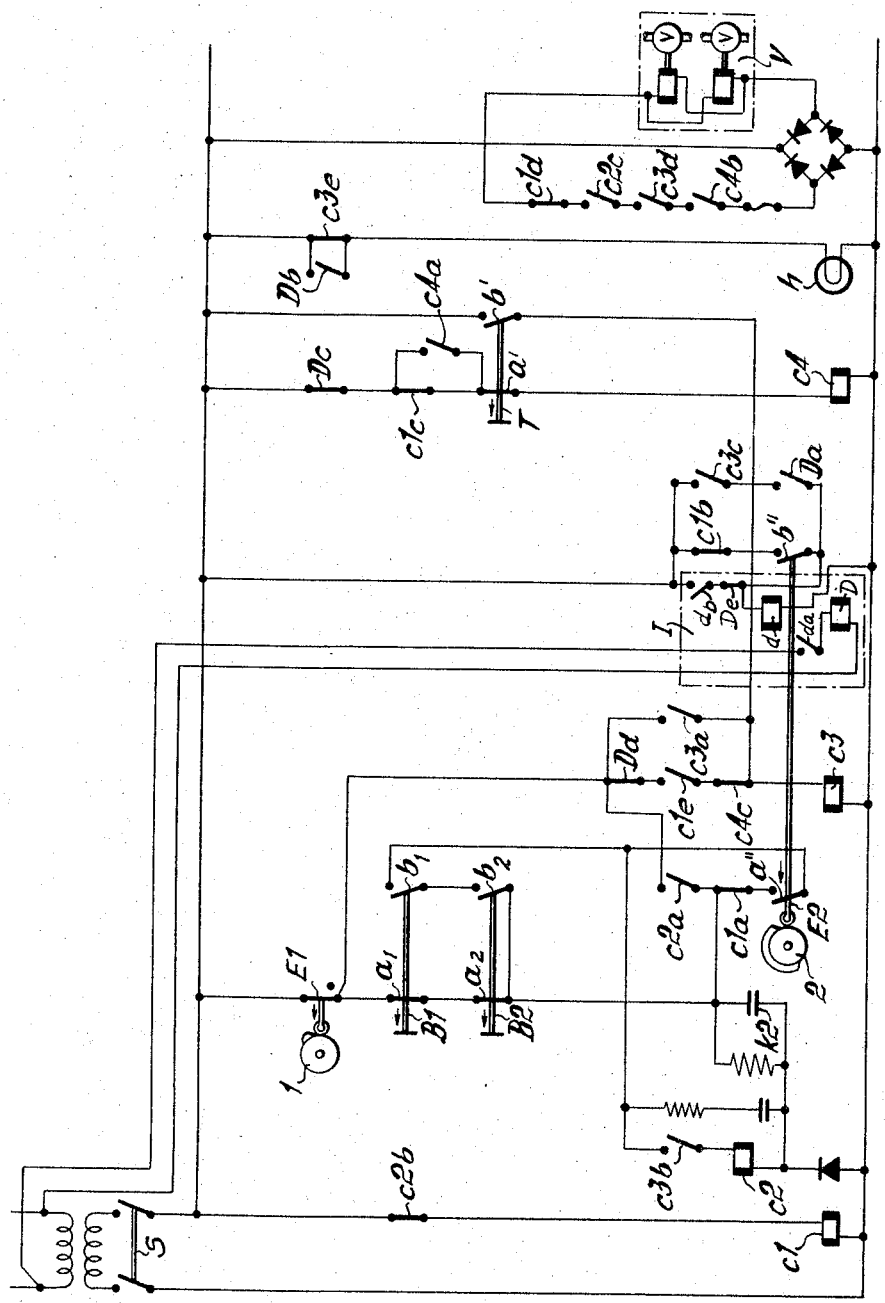

3,315,243
ELECTRICAL SAFETY CONTROL FOR MACHINE TOOLS
Heinrich Weiberg, Solingen-Wald, Germany, assignor to Th. Kieserling & Albrecht, Solingen, Germany
Filed Feb. 19, 1964, Ser. No. 346,024
Claims priority, application Germany, Feb. 20, 1963, K 49,014
16 Claims. (Cl. 340—220)

The present invention concerns machine tools having at least one movable operating member, and more specifically concerns an electrical safety control arrangement for controlling the operation of such a machine. The arrangement according to the invention is particularly well suited for being applied to a machine tool having at least one reciprocating operating member making alternatingly a work stroke and a subsequent return stroke, as for instance punch presses and other presses.

In many areas government regulations require such machines to be equipped with a so-called two-hand starting control whereby a great amount of safety is assured for the operator since it is impossible for the operator to start the machine and particularly the downstroke of the operating member without having both hands on the controls and thus removed from the dangerous operating area of the machine.

However, it has been found that it is desirable to increase the safety for the operator. Therefore, it is one object of this invention to provide for an electrical control arrangement which automatically detects any malfunction or failure in the entire control arrangement.

It is another object of this invention to provide for an arrangement of the type set forth which additionally in the case of a failure or malfunction furnishes a signal indicating that the machine or the control is not in order.

It is still another object of this invention to provide for an arrangement as mentioned above which additionally in the case of any malfunction or failure of the control arrangement prevents a further operation of the machine unless the cause of the failure or malfunction is removed.

A number of different electrical control arrangements for machine tools of the type mentioned above are known in the art. However, these known arrangements do not fully satisfy or are not capable of operating in a manner corresponding to the above mentioned objects of this invention. Therefore, for solving the problem, the invention includes in a machine tool having at least one movable operating member, in combination, a source of electric energy; electrically operable control means for starting and terminating the operation of the movable machine member and changeable by electrical energization from an idle position to an operation starting position and by deenergization back to said idle position whereby machine operation is terminated; first circuit means connected between said source and said electrically operable control means and including a plurality of relay switch means connected in series with each other so that said control means can be energized only when all said relay switch means are in conductive condition, and that said control means are caused to be in said idle position when at least one of said relay switch means is in non-conductive condition; second circuit means connected to said source and comprising a plurality of parallel circuits, each of said parallel circuits containing a relay coil means respectively associated with a different one of said relay switch means for operating the latter, and each parallel circuit containing a relay contact associated with and operable by a relay coil means located in a respectively different one of said parallel circuits; pilot switch means operatively connected with said movable machine member for being actuated depending upon a predetermined amount of movement of said machine member; delayed action relay means energizable by actuation of said pilot switch means and interrupting after a predetermined delay one of said parallel circuits containing one of said relay coils so as to cause deenergization of said electrically operable control means; and primary control switch means connected between said source and another one of said relay coils and operable for causing all of said series-connected relay switch means in said first circuit means to be in conductive condition so as to start operation of the machine.

It will be seen that in the arrangement according to the invention a plurality of switch means and control means are used, but all these means are electrically so interlocked and interconnected that each failure in any one of the switching or control means is immediately detected with a result of stopping further operation of the machine, preferably together with issuing an indicating signal adapted to bring to the attention of the operator that something is not in order in the machine or in its controls.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing, in which a safety control arrangement according to the invention is diagrammatically illustrated in the form of a circuit diagram.

Referring to the drawing it should be understood that in the circuit diagram all switches and contacts are shown in idle position i.e. in the position they would have when no part of the arrangement is energized. In the embodiment illustrated by way of example the source of electric energy is represented by an input transformer with a main switch S on its secondary side. Only the impulse generator I described further below is connected in this example with the primary side of the above mentioned transformer, all the other circuits of the arrangement are connected to, and controlled by, the main switch S as can be easily seen from the diagram. The machine tool is not shown in this diagram except for some of its components which are directly controlled by the arrangement according to the invention. There are electrically operable control means for starting and terminating the operation of the movable or reciprocating machine member, and these control means comprise, in the illustrated example, a solenoid valve arrangement V, and this arrangement may comprise two solenoid valves as illustrated, one for operating the clutch and the other one operating the brake of a press or punch press to be controlled in a conventional manner. A machine tool as contemplated would contain a rotary shaft the rotation of which is directly related to the movement of the movable or reciprocating operating member. This shaft or another shaft coupled therewith may carry a first and a second control cam 1 and 2, respectively, which control electrical pilot switches E1 and E2, respectively, as described further below.

It can be seen that for the actuation of the electrically operable control means V a control circuit is provided which, in addition to a conventional two-way rectifier comprises a group of relay switch contacts c1d, c2c, c3d and c4b, connected with each other in series so that the solenoids of the valves in the control arrangement V cannot be energized unless the just mentioned four relay switches are all simultaneously in conductive position.

The remaining circuit means of the control arrangement essentially comprise four parallel circuits each containing one relay coil and at least one relay switch contact associated with and operable by a relay coil located in another one of the parallel circuits. However, each of the relay coils in the four parallel circuits is associated with and operates one of the above mentioned series-connected relay contacts which control the valve arrangement V.

The relay coils mentioned above are designated by $c1$, $c2$, $c3$ and $c4$. The relay contacts operated by the individual relay coils are not shown directly next to the respective coil but rather, for the purpose of clarity of the diagram, they are where they are required for their operation. However, each relay switch contact is designated with the reference symbol of the pertaining relay coil with a letter $a$, $b$, $c$, $d$, etc. added in order to distinguish between the different relay contacts operated by one particular coil. For instance, the relay coil $c1$ is associated with and operates the relay switch contacts $c1a$, $c1b$, $c1c$, $c1d$, and $c1e$.

The first one of the parallel circuits contains the relay coil $c1$ and in series therewith the relay switch contact $c2b$. The second parallel circuit contains the relay coil $c2$ and in series therewith the relay switch contact $c3b$ and some other control switches. These additional control switches are the already mentioned cam control switch E1 and two switches $b_1$ and $b_2$ connected in series with each other and operable by the two-hand control buttons B1 and B2, respectively, under the assumption that the arrangement is connected with a machine tool equipped with two-hand control. Of course, if such two-hand control is not provided for or not required by law, the arrangement could as well be operated by a single switch $b_1$ with the aid of a single control button B1. Other control elements operatively associated with the second control circuit will be described further below. The third parallel circuit contains the relay coil $c3$ and connected in series therewith the relay switch contact $c4c$, $c1e$, and a relay switch contact D$d$ to be operated by the impulse generator I described below. The contact D$d$ is connected with the cam operated switch contact E1. The fourth parallel circuit contains the relay coil $c4$ which is connected in series with a control switch T described further below, with the relay switch contact $c1c$, and another relay contact D$c$ operated by the impulse generator I.

There is further provided in this embodiment a fifth parallel circuit containing an electrically operable indicator e.g. a light bulb $h$ in series with a relay switch contact $c3e$ which is supplemented by a relay contact D$b$, connected in parallel therewith, and operable also by the impulse generator I.

It should be noted that the above mentioned two-hand control device comprises also two series-connected switches $a1$ and $a2$ actuated, upon actuation of the buttons B1 and B2, simultaneously with the above mentioned switches $b_1$ and $b_2$, respectively. Also the above mentioned second control switch T comprises an additional, normally open switch contact $b'$ located in a branch line connecting the relay coil $c3$ with one terminal of the source. The above mentioned relay switch contact $c1c$ is shunted by another relay switch contact $c4a$. A capacitor $k2$ is connected in circuit between one terminal of the relay coil $c2$ and the series-connected switches $b_1$ and $b_2$ for reasons which will be explained further below. A relay switch contact $c3a$ is connected in parallel with the above mentioned switches $c4c$, $c1e$ and D$d$.

A cam operable switch E2 is operatively associated with the above mentioned machine-operated cam 2 and is designed to operate two normally open switches $a''$ and $b''$. The switch $a''$ is connected in series with two relay switches $c1a$ and $c2a$ as illustrated.

It remains now to describe the above mentioned impulse generator I and some relay switches cooperating therewith. In general, the impulse generator I is actually a delayed action relay of conventional design. It can be operated in such a manner that after receiving an impulse this impulse generator I will issue an impulse of predetermined duration but after a predeterminable delay. Without going into further details it can be seen that the generator I comprises two relay coils $d$ and D. The relay coil $d$ operates the two relay switch contacts $da$ and $d_b$, while the other relay coil D operates the already above mentioned relay switch contacts D$a$, D$b$, D$c$ and D$d$, and additionally the switch contact D$e$ located inside the generator I. The relay coil D is connected via the relay contact $da$ in circuit with the primary side of the input transformer, while the relay coil $d$ is connected via various switch contacts in parallel with the other above mentioned parallel circuits of the system. Outside the impulse generator I the already mentioned switches $b''$ and D$a$ as well as two relay switch contacts $c1b$ and $c3c$ are arranged for cooperation with the generator I, as illustrated. It will be understood that for instance upon closing of the contact $b''$ the relay coil $d$ would be energized, and as a consequence, after a predetermined delay, the contact $da$ would be closed for energizing the relay coil D. This, in turn, would result in the operation of all the above mentioned relay contacts associated with the coil D.

The operation of the above described arrangement is as follows: Upon closing the main switch S the indicator e.g. the light bulb $h$ will be switched on provided that the relay switch contact $c3e$ was properly in closed position. The relay coil $c1$ in the first parallel circuit is energized provided that the relay switch contact $c2b$ was properly in closed condition. As a result the associated normally closed relay contacts $c1a$, $c1b$, $c1c$ and $c1d$ in the other circuits of the arrangement are moved to open position. Additionally, the normally open contact $c1e$ is moved to closed position. Just before the relay coil $c1$ has actuated its associated contacts with a small predetermined delay, the relay coil $c4$ in the fourth parallel circuit has been also energized upon closing of the main switch S. Consequently its associated relay contacts $c4a$ and $c4b$ have been closed and its contact $c4c$ has been opened. In order to test the operativeness of the control arrangement and in order to make the entire arrangement ready for machine operation, the operator would now actuate the push button switch T which also is intended to extingush the indicator lamp $h$ because from now on this indicator lamp has the function of indicating whether the control arrangement is in proper order or not. By actuation of the push button control switch T the pertaining contact $a'$ is opened while the associated contact $b'$ is closed. By the closing of the contact $b'$ the relay coil $c3$ in the third parallel circuit is energized and is kept in such energized condition by the closing of its holding contact $c3a$ via the closed contact E1, even after the push button control switch T has been released so that the contacts $a'$ and $b'$ return to their illustrated positions. The energization of the relay coil $c3$ results in the closing of the relay contacts $c3b$, $c3c$ and $c3d$, while at the same time the normally closed contact $c3e$ is opened. Hereby the indicator lamp $h$ is extinguished.

By temporarily opening the contact $a'$ in the fourth parallel circuit the relay coil $c4$ has been deenergized in spite of its holding contact $c4a$ which is now opened as well as its contact $c4b$ while the contact $c4c$ returns to closed condition. Now the entire arrangement is ready for starting the machine operation.

For starting the operation of the machine the two-hand control buttons B1 and B2 are simultaneously actuated so that the two series-connected switches $a_1$, $a_2$ are opened while the also series-connected switches $b_1$, $b_2$ are simultaneously closed. It is to be understood that upon closing of the main switch S the capacitor $k_2$ has been charged via the closed switches E1, $a_1$ and $a_2$. Upon the above described actuation of the two-hand control the capacitor $k_2$ is discharged across the relay coil $c2$ via the closed relay switch contact $c3b$ and the closed switches $b_1$, $b_2$. As a result the relay contact $c2b$ is opened and the contact $c2a$ as well as $c2c$ are closed. The relay coil $c1$ is consequently deenergized and all its contacts $c1a$, $c1b$, $c1c$, $c1d$ and $c1e$ return to their respective illustrated positions. By the closing of the contact $c1c$ the relay coil $c4$ is again energized. Consequently the relay contact $c4b$ is again closed so that now all the four series-connected relay contacts $c1d$, $c2c$, $c3d$ and $c4b$ are in closed position whereby energization of the control arrangement V is effected and the machine operation correspondingly started.

If the machine tool controlled by the above arrangement is e.g. a punch press, then a short time before the termination of the down stroke of the ram the cam 1 would open for a brief moment the switch E1. Thereafter, almost at the lowest position of the ram the other cam 2 would actuate the cam operated switch E2 so that the pertaining contacts or switches $a''$ and $b''$ are closed. Now the operator may release the two-hand control buttons B1, B2 because the switch E2 acts as a substitute for this two-hand control. As a matter of fact, the relay coil $c2$ is now kept energized via the contacts or switches E1, $c2a$, $c1a$, $a''$ and $c3b$. Consequently also the relay contact $c2c$ remains closed and as a result the solenoids of the control arrangement V remain energized.

However, by the closing of the switch $b''$ the impulse generator I is also energized. Consequently the relay coil $d$ is energized via the closed relay contact $c1b$. As a result, the relay contact $da$ and $d_b$ are moved to closed position whereby the relay coil D is energized. It responds with a predetermined delay and actuates all its associated relay contacts $Da$, $Db$, $Dc$, $Dd$ and $De$. The delayed opening of the contact $De$ deenergizes the coil D indirectly by denergization of the coil $d$, so that now also the contact $Da$ is again opened. It is understood that the closed position of contact $Da$ resulted in holding the coil $d$ energized irrespective of the meanwhile occurring opening of the switch $b''$. Consequently it will be understood that the operation of the impulse generator I can only occur again upon a repeated closing of the switch $b''$.

It is to be understood, of course, that before the impulse generator I delivers an impulse i.e. actuates its various relay contacts, the switches $a''$ and $b''$ have returned to their normal open position and also the pilot switch E1 has been opened because at the respective moment the cams 1 and 2 have already passed the respective cam followers. Hereby the relay coils $c2$ and $c3$ are deenergized. On the other hand, the action of the impulse generator I closes the relay switch $Db$ and opens the relay switches $Dc$ and $Dd$. Hereby also the relay coil $c4$ is deenergized and consequently the relay contact $c4b$ is opened with the result that accordingly the control arrangement V is also deenergized. At the same time the closing of the switch or contact $Db$ causes the indicator light $h$ to be switched on. Consequently the entire arrangement is again in the same condition where it was before this cycle of operation had been started by the actuation of the two-hand control B1 and B2.

The same action and operation can be repeated in the same manner.

It will be understood that the above described operation is only possible if all elements of the control arrangement operate in perfect order. However, in accordance with the invention any failure or malfunction of any one of the above described relays or pilot switches results immediately in an interruption of the control circuit for the valve control arrangement V while at the same time switching on the indicator light for the purpose of furnishing a signal that tells the operator that some component of the arrangement is not working properly. A few examples of such occurrences are described herebelow:

1. The impulse generator I fails

In this case the switch contact $Da$ would not be closed and the contacts $Dc$ and $Dd$ would not be opened so that the relay coil $c4$ would remain energized and consequently the contact $c4c$ would remain opened and consequently the relay coil $c3$ could not be energized. Under these circumstances the relay contact $c3e$ would remain closed and keep the signal light $h$ in energized condition instead of being lit only for a brief period of time. Moreover, the relay contact $c3b$ remains open so that the relay coil $c2$ cannot be energized. Consequently also the contact $c2c$ in the control circuit for the valve arrangement V cannot be closed and consequently the machine cannot be further operated.

2. Cam operated switch E2 fails

Assuming that the switches $a''$ and $b''$ get stuck in closed position, then switch $Dd$ is kept open so that the relay coil $c3$ cannot be energized although the contacts $c1e$ and $c4c$ are in closed position. Consequently, again the signal light $h$ is energized because the contact $c3e$ is not moved to open position by energization of the coil $c3$. In addition the contact $c3d$ is not moved to closed position so that hereby alone the control circuit for the valve arrangement V is interrupted and the machine operation is stopped. Besides, the relay coil $c2$ could not be energized because the contact $c3b$ remains in open condition.

3. Pilot switch E1 fails

If the switch E1 is not moved to open position the relay coil $c3$ remains energized because the holding contact $c3$ was in closed condition. Moreover also the contact $c3c$ is closed with the result that again the signal light $h$ is lit for indicating trouble. In addition, since also the switch contact $Da$ is in closed position the impulse generator I remains energized. However, the switch contact $Dc$ is in open condition and remains so, so that the relay coil $c4$ cannot be energized and the important control contact $c4b$ remains also in open position. Consequently, since also the switch contact $Db$ remains closed the signal is given by the indicator bulb $h$ and simultaneously the control circuit for the valve arrangement V is interrupted and further machine operation is prevented.

It will be understood by those skilled in the art that in addition to the above specifically described examples also any other failure of any one of the relays in the arrangement would result in preventing any further operation of the machine tool and would cause the alarm signal $h$ to be lit until the trouble is removed. This advantageous operation of the entire arrangement is due to the fact that all the parallel circuits described above are interconnected or interlocked operatively in such a manner that a failure in any one of these parallel circuits results in a situation which prevents further operation of the machine. As a result, the control arrangement according to the invention adds greatly to the safety of the machine operator in addition to the safety arrived at by a two-hand machine control. However, it should not be overlooked that the arrangement according to the invention is likewise of great advantage even in those cases where single-hand control is used with the particular machine tool.

It will be understood that each of the elements described above, or two or more together, may also find a useful application in other types of a safety control arrangement in a machine tool having at least one movable operating member differing from the types described above.

While the invention has been illustrated and described as embodied in a safety control arrangement in a machine tool having at least one movable operating member including a plurality of relay circuits so interlocked operatively that failure in one of them results in prevention of further machine operation, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a machine tool having at least one movable operating member, in combination, a source of electric energy; electrically operable control means for starting and terminating the operation of the movable machine member and changeable by electrical energization from an idle position to an operation starting position and by deenergization back to said idle position whereby machine operation is terminated; first circuit means connected between said source and said electrically operable control means and including a plurality of relay switch means connected in series with each other so that said control means can be energized only when all said relay switch means are in conductive condition, and that said control means are caused to be in said idle position when at least one of said relay switch means is in non-conductive condition; second circuit means connected to said source and comprising a plurality of parallel circuits, each of said parallel circuits containing a relay coil means respectively associated with a different one of said relay switch means for operating the latter, and each parallel circuit containing a relay contact associated with and operable by a relay coil means located in a respectively different one of said parallel circuits; pilot switch means operatively connected with said movable machine member for being actuated depending upon a predetermined amount of movement of said machine member; delayed action relay means energizable by actuation of said pilot switch means and interrupting after a predetermined delay one of said parallel circuits containing one of said relay coils so as to cause deenergization of said electrically operable control means; and primary control switch means connected to said source and to at least one of said relay coils and cooperating with all of said series-connected relay switch means in said first circuit means for causing the same to be in conductive condition so as to start operation of the machine.

2. In a machine tool having at least one movable operating member, in combination, a source of electric energy; electrically operable control means for starting and terminating the operation of the movable machine member and changeable by electrical energization from an idle position to an operation starting position and by deenergization back to said idle position whereby machine operation is terminated; first circuit means connected between said source and said electrically operable control means and including a plurality of relay switch means connected in series with each other so that said control means can be energized only when all said relay switch means are in conductive condition, and that said control means are caused to be in said idle position when at least one of said relay switch means is in non-conductive condition; second circuit means connected to said source and comprising a plurality of parallel circuits, each of said parallel circuits containing a relay coil means respectively associated with a different one of said relay switch means for operating the latter, and each parallel circuit containing a relay contact associated with and operable by a relay coil means located in a respectively different one of said parallel circuits, said second circuit means further including electrically operable indicator means and a special relay contact for controlling said indicator means; pilot switch means operatively connected with said movable machine member for being actuated depending upon a predetermined amount of movement of said machine member; delayed action relay means energizable by actuation of said pilot switch means and interrupting after a predetermined delay one of said parallel circuits containing one of said relay coils so as to cause deenergization of said electrically operable control means, and closing, when energized, said special relay contact for a predetermined brief period of time so as to energize briefly said indicator means causing it to issue a signal indicating that said control means are in idle position and that the entire circuit is in condition for normal operation; and primary control switch means connected to said source and to at least one of said relay coils and cooperating with all of said series-connected relay switch means in said first circuit means for causing the same to be in conductive condition so as to start operation of the machine.

3. In a machine tool having at least one reciprocating operating member adapted to carry out alternatingly a work stroke and a subsequent return stroke, in combination, a source of electric energy; electrically operable control means for starting and terminating the operation of the reciprocating machine member and changeable by electrical energization from an idle position to an operation starting position and by deenergization back to said idle position whereby machine operation is terminated; first circuit means connected between said source and said electrically operable control means and including a plurality of relay switch means connected in series with each other so that said control means can be energized only when all said relay switch means are in conductive condition, and that said control means are caused to be in said idle position when at least one of said relay switch means is in non-conductive condition; second circuit means connected to said source and comprising a plurality of parallel circuits, each of said parallel circuits containing a relay coil means respectively associated with a different one of said relay switch means for operating the latter, and each parallel circuit containing a relay contact associated with and operable by a relay coil means located in a respectively different one of said parallel circuits; pilot switch means operatively connected indirectly with said reciprocating machine member for being actuated depending upon a predetermined amount of movement of said machine member during its work stroke; delayed action relay means energizable by actuation of said pilot switch means and interrupting after a predetermined delay one of said parallel circuits containing one of said relay coils so as to cause deenergization of said electrically operable control means; and primary control switch means connected to said source and to at least one of said relay coils and cooperating with all of said series-connected relay switch means in said first circuit means for causing the same to be in conductive condition so as to start operation of the machine.

4. In a machine tool having at least one reciprocating operating member adapted to carry out alternatingly a work stroke and a subsequent return stroke, in combination, a source of electric energy; electrically operable control means for starting and terminating the operation of the reciprocating machine member and changeable by electrical energization from an idle position to an operation starting position and by deenergization back to said idle position whereby machine operation is terminated; first circuit means connected between said source and said electrically operable control means and including a plurality of relay switch means connected in series with each other so that said control means can be energized only when all said relay switch means are in conductive condition, and that said control means are caused to be in said idle position when at least one of said relay switch means is in non-conductive condition; second circuit means connected to said source and comprising a plurality of parallel circuits, each of said parallel circuits containing a relay coil means respectively associated with a different one of said relay switch means for operating the latter, and each parallel circuit containing a relay contact associated with and operable by a relay coil means located in a respectively different one of said parallel circuits, said second circuit means further including electrically operable indicator means and a special relay contact for controlling said indicator means; pilot switch means operatively connected indirectly with said reciprocating machine member for being actuated depending upon a predetermined amount of movement of said machine member during its work stroke; delayed action relay means energizable by actuation of said pilot switch means and interrupting after a predetermined delay one of said parallel circuits containing one of said relay coils so as to cause deenergization of said electrically operable control means, and closing, when energized, said special relay contact for a predetermined brief period of time so as to energize briefly said indicator means causing it to issue a signal indicating that said control means are in idle position and that the entire circuit is in condition for normal operation; and primary control switch means connected to said source and to at least one of said relay coils and cooperating with all of said series-connected relay switch means in said first circuit means for causing the same to be in conductive condition so as to start operation of the machine.

5. In a machine tool having at least one movable operating member, in combination, a source of electric energy; electrically operable control means for starting and terminating the operation of the movable machine member and changeable by electrical energization from an idle position to an operation starting position and by deenergization back to said idle position whereby machine operation is terminated; first circuit means connected between said source and said electrically operable control means and including a plurality of relay switch means connected in series with each other so that said control means can be energized only when all said relay switch means are in conductive condition, and that said control means are caused to be in said idle position when at least one of said relay switch means is in non-conductive condition; second circuit means connected to said source and comprising a plurality of parallel circuits, each of said parallel circuits containing a relay coil means respectively associated with a different one of said relay switch means for operating the latter, and each parallel circuit containing a relay contact associatetd with and operable by a relay coil means located in a respectively different one of said parallel circuits; pilot switch means operatively connected with said movable machine member for being actuated depending upon a predetermined amount of movement of said machine member; delayed action relay means energizable by actuation of said pilot switch means and interrupting after a predetermined delay one of said parallel circuits containing one of said relay coils so as to cause deenergization of said electrically operable control means; and primary control switch means comprising two series-connected switches for simultaneous two-hand control and connected to said source and to at least one of said relay coils and cooperating with all of said series-connected relay switch means in said first circuit means for causing the same to be in conductive condition so as to start operation of the machine.

6. In a machine tool having at least one movable operating member, in combination, a source of electric energy; electrically operable control means for starting and terminating the operation of the movable machine member and changeable by electrical energization from an idle position to an operation starting position and by deenergization back to said idle position whereby machine operation is terminated; first circuit means connected between said source and said electrically operable control means and including a plurality of relay switch means connected in series with each other so that said control means can be energized only when all said relay switch means are in conductive condition, and that said control means are caused to be in said idle position when at least one of said relay switch means is in non-conductive condition; second circuit means connected to said source and comprising a plurality of parallel circuits, each of said parallel circuits containing a relay coil means respectively associated with a different one of said relay switch means for operating the latter, and each parallel circuit containing a relay contact associated with and operable by a relay coil means located in a respectively different one of said parallel circuits, said second circuit means further including electrically operable indicator means and a special relay contact for controlling said indicator means; pilot switch means operatively connected with said movable machine member for being actuated depending upon a predetermined amount of movement of said machine member; delayed action relay means energizable by actuation of said pilot switch means and interrupting after a predetermined delay one of said parallel circuits containing one of said relay coils so as to cause deenergization of said electrically operable control means, and closing, when energized, said special relay contact for a predetermined brief period of time so as to energize briefly said indicator means causing it to issue a signal indicating that said control means are in idle position and that the entire circuit is in condition for normal operation; and primary control switch means comprising two series-connected switches for simultaneous two-hand control and connected to said source and to at least one of said relay coils and cooperating with all of said series-connected relay switch means in said first circuit means for causing the same to be in conductive condition so as to start operation of the machine.

7. In a machine tool having at least one reciprocating operating member adapted to carry out alternatingly a work stroke and a subsequent return stroke, in combination, a source of electric energy; electrically operable control means for starting and terminating the operation of the reciprocating machine member and changeable by electrical energization from an idle position to an operation starting position and by deenergization back to said idle position whereby machine operation is terminated; first circuit means connected between said source and said electrically operable control means and including a plurality of relay switch means connected in series with each other so that said control means can be energized only when all said relay switch means are in conductive condition, and that said control means are caused to be in said idle position when at least one of said relay switch means is in non-conductive condition; second circuit means connected to said source and comprising a plurality of parallel circuits, each of said parallel circuits containing a relay coil means respectively associated with a different one of said relay switch means for operating the latter, and each parallel circuit containing a relay contact associated with and operable by a relay coil means located in a respectively different one of said parallel circuits; pilot switch means operatively connected indirectly with said reciprocating machine member for being actuated depending upon a predetermined amount of movement of said machine member during its work stroke; delayed action relay means energizable by actuation of said pilot switch means and interrupting after a predetermined delay one of said parallel circuits containing one of said relay coils so as to cause deenergization of electrically operable control means; and primary control switch means comprising two series-connected switches for simultaneous two-hand control and connected to said source and to at least one of said relay coils and cooperating with all of said series-connected relay switch means in said first circuit means for causing the same to be in conductive condition so as to start operation of the machine.

8. In a machine tool having at least one reciprocating operating member adapted to carry out alternatingly a work stroke and a subsequent return stroke, in combination, a source of electric energy; electrically operable control means for starting and terminating the operation of the reciprocating machine member and changeable by electrical energization from an idle position to an operation starting position and by deenergization back to said idle position whereby machine operation is terminated; first circuit means connected between said source and said electrically operable control means and including a plurality of relay switch means connected in series with each other so that said control means can be energized only when all said relay switch means are in conductive condition, and that said control means are caused to be in said idle position when at least one of said relay switch means is in non-conductive condition; second circuit means connected to said source and comprising a plurality of parallel circuits, each of said parallel circuits containing a relay coil means respectively associated with a different one of said relay switch means for operating the latter, and each parallel circuit containing a relay contact associated with and operable by a relay coil means located in a respectively different one of said parallel circuits, said second circuit means further including electrically operable indicator means and a special relay contact for controlling said indicator means; pilot switch means operatively connected indirectly with said reciprocating machine member for being actuated depending upon a predetermined amount of movement of said machine member during its work stroke; delayed action relay means energizable by actuation of said pilot switch means and interrupting after a predetermined delay one of said parallel circuits containing one of said relay coils so as to cause deenergization of said electrically operable control means, and closing, when energized, said special relay contact for a predetermined brief period of time so as to energize briefly said indicator means causing it to issue a signal indicating that said control means are in idle position and that the entire circuit is in condition for normal operation; and primary control switch means comprising two series-connected switches for simultaneous two-hand control and connected to said source and to at least one of said relay coils and cooperating with all of said series-connected relay switch means in said first circuit means for causing the same to be in conductive condition so as to start operation of the machine.

9. In a machine tool having at least one movable operating member, in combination, a source of electric energy; electrically operable control means for starting and terminating the operation of the movable machine member and changeable by electrical energization from an idle position to an operation starting position and by deenergization back to said idle position whereby machine operation is terminated; first circuit means connected between said source and said electrically operable control means and including four relay switch means connected in series with each other so that said control means can be energized only when all said relay switch means are in conductive condition, and that said control means are caused to be in said idle position when at least one of said relay switch means is in non-conductive condition; second circuit means connected to said source and comprising four primary parallel circuits, each of said parallel circuits containing a relay coil means respectively associated with a different one of said four relay switch means for operating the latter, and the first one of said parallel circuits containing a normally closed relay contact operable by a relay coil means located in the second one of said parallel circuits, said second parallel circuit containing a normally open relay contact operable by a relay coil means located in the third one of said parallel circuits, said third parallel circuit containing a normally closed relay contact operable by a relay coil means located in the fourth one of said parallel circuits and said fourth parallel circuit containing a normally closed relay contact operable by a relay coil means located in said first parallel circuit; pilot switch means operatively connected with said movable machine member for being actuated depending upon a predetermined amount of movement of said machine member; delayed action relay means energizable by actuation of said pilot switch means and interrupting after a predetermined delay said fourth one of said parallel circuits containing one of said relay coils so as to cause deenergization of said electrically operable control means; and primary control switch means connected to said source and to at least one of said relay coils and cooperating with all of said series-connected relay switch means in said first circuit means for causing the same to be in conductive condition so as to start operation of the machine.

10. In a machine tool having at least one movable operation member, in combination, a source of electric energy; electrically operable control means for starting and terminating the operation of the movable machine member and changeable by electrical energization from an idle position to an operation starting position and by deenergization back to said idle position whereby machine operation is terminated; first circuit means connected between said source and said electrically operable control means and including four relay switch means connected in series with each other so that said control means can be energized only when all said relay switch means are in conductive condition, and that said control means are caused to be in said idle position when at least one of said relay switch means is in non-conductive condition; second circuit means connected to said source and comprising four primary parallel circuits, each of said parallel circuits containing a relay coil means respectively associated with a different one of said four relay switch means for operating the latter, and the first one of said parallel circuits containing a normally closed relay contact operable by a relay coil means located in the second one of said parallel circuits, said second parallel circuit containing a normally open relay contact operable by a relay coil means located in the third one of said parallel circuits, said third parallel circuit containing a normally closed relay contact operable by a relay coil means located in the fourth one of said parallel circuits and said fourth parallel circuit containing a normally closed relay contact operable by a relay coil means located in said first parallel circuit, said second circuit means further including a fifth parallel circuit containing electrically operable indicator means and a special relay contact for controlling said indicator means; pilot switch means operatively connected with said movable machine member for being actuated depending upon a predetermined amount of movement of said machine member; delayed action relay means energizable by actuation of said pilot switch means and interrupting after a predetermined delay said fourth one of said parallel circuits containing one of said relay coils so as to cause deenergization of said electrically operable control means, and closing, when energized, said special relay contact for a predetermined brief period of time so as to energize briefly said indicator means causing it to issue a signal indicating that said control means are in idle position and that the entire circuit is in condition for normal operation; and primary control switch means connected to said source and to at least one of said relay coils and cooperating with all of said series-connected relay switch means in said first circuit means for causing the same to be in conductive condition so as to start operation of the machine 11. In a machine tool having at least one reciprocating operating member adapted to carry out alternatingly a work stroke and a subsequent return stroke, in combination, a source of electric energy; electrically operable control means for starting and terminating the operation of the reciprocating machine member and changeable by electrical energization from an idle position to an operation starting position and by deenergization back to said idle position whereby machine operation is terminated; first circuit means connected between said source and said electrically operable control means and including four relay switch means connected in series with each other so that said control means can be energized only when all said relay switch means are in conductive condition, and that said control means are caused to be in said idle position when at least one of said relay switch means is in non-conductive condition; second circuit means connected to said source and comprising four primary parallel circuits, each of said parallel circuits containing a relay coil means respectively associated with a different one of said four relay switch means for operating the latter, and the first one of said parallel circuits containing a normally closed relay contact operable by a relay coil means located in the second one of said parallel circuits, said second parallel circuit containing a normally open relay contact operable by a relay coil means located in the third one of said parallel circuits, said third parallel circuit containing a normally closed relay contact operable by a relay coil means located in the fourth one of said parallel circuits and said fourth parallel circuit containing a normally closed relay contact operable by a relay coil means located in said first parallel circuit; pilot switch means operatively connected indirectly with said reciprocating machine member for being actuated depending upon a predetermined amount of movement of said machine member during its work stroke; delayed action relay means energizable by actuation of said pilot switch means and interrupting after a predetermined delay said fourth one of said parallel circuits containing one of said relay coils so as to cause deenergization of said electrically operable control means; and primary control switch means connected to said source and to at least one of said relay coils and cooperating with all of said series-connected relay switch means in said first circuit means for causing the same to be in conductive condition so as to start operation of the machine.

12. In a machine tool having at least one reciprocating operating member adapted to carry out alternatingly a work stroke and a subsequent return stroke, in combination, a source of electric energy; electrically operable control means for starting and terminating the operation of the reciprocating machine member and changeable by electrical energization from an idle position to an operation starting position and by deenergization back to said idle position whereby machine operation is terminated; first circuit means connected between said source and said electrically operable control means and including four relay switch means connected in series with each other so that said control means can be energized only when all said relay switch means are in conductive condition, and that said control means are caused to be in said idle position when at least one of said relay switch means is in non-conductive condition; second circuit means connected to said source and comprising four primary parallel circuits, each of said parallel circuits containing a relay coil means respectively associated with a different one of said four relay switch means for operating the latter, and the first one of said parallel circuits containing a normally closed relay contact operable by a relay coil means located in the second one of said parallel circuits, said second parallel circuit containing a normally open relay contact operable by a relay coil means located in the third one of said parallel circuits, said third parallel circuit containing a normally closed relay contact operable by a relay coil means located in the fourth one of said parallel circuits and said fourth parallel circuit containing a normally closed relay contact operable by a relay coil means located in said first parallel circuit, said second circuit means further including a fifth parallel circuit containing electrically operable indicator means and a special relay contact for controlling said indicator means; pilot switch means operatively connected indirectly with said reciprocating machine member for being actuated depending upon a predetermined amount of movement of said machine member during its work stroke; delayed action relay means energizable by actuation of said pilot switch means and interrupting after a predetermined delay said fourth one of said parallel circuits containing one of said relay coils so as to cause deenergization of said electrically operable control means, and closing, when energized, said special relay contact for a predetermined brief period of time so as to energize briefly said indicator means causing it to issue a signal indicating that said control means are in idle position and that the entire circuit is in condition for normal operation; and primary control switch means connected to said source and to at least one of said relay coils and cooperating with all of said series-connected relay switch means in said first circuit means for causing the same to be in conductive condition so as to start operation of the machine.

13. In a machine tool having at least one movable operating member, in combination, a source of electric energy; electrically operable control means for starting and terminating the operation of the movable machine member and changeable by electrical energization from an idle position to an operation starting position and by deenergization back to said idle position whereby machine operation is terminated; first circuit means connected between said source and said electrically operable control means and including four relay switch means connected in series with each other so that said control means can be energized only when all said relay switch means are in conductive condition, and that said control means are caused to be in said idle position when at least one of said relay switch means is in non-conductive condition; second circuit means connected to said source and comprising four primary parallel circuits, each of said parallel circuits containing a relay coil means respectively associated with a different one of said four relay switch means for operating the latter, and the first one of said parallel circuits containing a normally closed relay contact operable by a relay coil means located in the second one of said parallel circuits, said second parallel circuit containing a normally open relay contact operable by a relay coil means located in the third one of said parallel circuits, said third parallel circuit containing a normally closed relay contact operable by a relay coil means located in the fourth one of said parallel circuits and said fourth parallel circuit containing a normally closed relay contact operable by a relay coil means located in said first parallel circuit; pilot switch means operatively connected with said movable machine member for being actuated depending upon a predetermined amount of movement of said machine member; delayed action relay means energizable by actuation of said pilot switch means and interrupting after a predetermined delay said fourth one of said parallel circuits containing one of said relay coils so as to cause deenergization of said electrically operable control means; and primary control switch means comprising two series-connected switches for simultaneous two-hand control and connected to said source and to at least one of said relay coils and cooperating with all of said series-connected relay switch means in said first circuit means for causing the same to be in conductive condition so as to start operation of the machine.

14. In a machine tool having at least one movable operating member, in combination, a source of electric energy; electrically operable control means for starting and terminating the operation of the movable machine member and changeable by electrical energization from an idle position to an operation starting position and by deenergization back to said idle position whereby machine operation is terminated; first circuit means connected between said source and said electrically operable control means and including four relay switch means connected in series with each other so that said control means can be energized only when all said relay switch means are in conductive condition, and that said control means are caused to be in said idle position when at least one of said relay switch means is in non-conductive condition; second circuit means connected to said source and comprising four primary parallel circuits, each of said parallel circuits containing a relay coil means respectively associated with a different one of said four relay switch means for operating the latter, and the first one of said parallel circuits containing a normally closed relay contact operable by a relay coil means located in the second one of said parallel circuits, said second parallel circuit containing a normally open relay contact operable by a relay coil means located in the third one of said parallel circuits, said third parallel circuit containing a normally closed relay contact operable by a relay coil means located in the fourth one of said parallel circuits and said fourth parallel circuit containing a normally closed relay contact operable by a relay coil means located in said first parallel circuit, said second circuit means further including a fifth parallel circuit containing electrically operable indicator means and a special relay contact for controlling said indicator means; pilot switch means operatively connected with said movable machine member for being actuated depending upon a predetermined amount of movement of said machine member; delayed action relay means energizable by actuation of said pilot switch means and interrupting after a predetermined delay said fourth one of said parallel circuits containing one of said relay coils so as to cause deenergization of said electrically operable control means, and closing, when energized, said special relay contact for a predetermined brief period of time so as to energize briefly said indicator means causing it to issue a signal indicating that said control means are in idle position and that the entire circuit is in condition for normal operation; and primary control switch means comprising two series-connected switches for simultaneous two-hand control and connected to said source and to at least one of said relay coils and cooperating with all of said series-connected relay switch means in said first circuit means for causing the same to be in conductive condition so as to start operation of the machine.

15. In a machine tool having at least one reciprocating operating member adapted to carry out alternatingly a work stroke and a subsequent return stroke, in combination, a source of electric energy; electrically operable control means for starting and terminating the operation of the reciprocating machine member and changeable by electrical energization from an idle position to an operation starting position and by deenergization back to said idle position whereby machine operation is terminated; first circuit means connected between said source and said electrically operable control means and including four relay switch means connected in series with each other so that said control means can be energized only when all said relay switch means are in conductive condition, and that said control means are caused to be in said idle position when at least one of said relay switch means is in non-conductive condition; second circuit means connected to said source and comprising four primary parallel circuits, each of said parallel circuits containing a relay coil means respectively associated with a different one of said four relay switch means for operating the latter, and the first one of said parallel circuits containing a normally closed relay contact operable by a relay coil means located in the second one of said parallel circuits, said second parallel circuit containing a normally open relay contact operable by a relay coil means located in the third one of said parallel circuits, said third parallel circuit containing a normally closed relay contact operable by a relay coil means located in the fourth one of said parallel circuits and said fourth parallel circuit containing a normally closed relay contact operable by a relay coil means located in said first parallel circuit; pilot switch means operatively connected indirectly with said reciprocating machine member for being actuated depending upon a predetermined amount of movement of said machine member during its work stroke; delayed action relay means energizable by actuation of said pilot switch means and interrupting after a predetermined delay said fourth one of said parallel circuits containing one of said relay coils so as to cause deenergization of said electrically operable control means; and primary control switch means comprising two series-connected switches for simultaneous two-hand control and connected to said source and to at least one of said relay coils and cooperating with all of said series-connected relay switch means in said first circuit means for causing the same to be in conductive condition so as to start operation of the machine.

16. In a machine tool having at least one reciprocating operating member adapted to carry out alternatingly a work stroke and a subsequent return stroke, in combination, a source of electric energy; electrically operable control means for starting and terminating the operation of the reciprocating machine member and changeable by electrical energization from an idle position to an operation starting postion and by deenergization back to said idle position whereby machine operation is terminated; first circuit means connected between said source and said electrically operable control means and including four relay switch means connected in series with each other so that said control means can be energized only when all said relay switch means are in conductive condition, and that said control means are caused to be in said idle position when at least one of said relay switch means is in non-conductive condition; second circuit means connected to said source and comprising four primary parallel circuits, each of said parallel circuits containing a relay coil means respectively associated with a different one of said four relay switch means for operating the latter, and the first one of said parallel circuits containing a normally closed relay contact operable by a relay coil means located in the second one of said parallel circuits, said second parallel circuit containing a normally open relay contact operable by a relay coil means located in the third one of said parallel circuits, and third parallel circuit containing a normally closed relay contact operable by a relay coil means located in the fourth one of said parallel circuits and said fourth parallel circuit containing a normally closed relay contact operable by a relay coil means located in said first parallel circuit, said second circuit means further including a fifth parallel circuit containing electrically operable indicator means and a special relay contact for controlling said indicator means; pilot switch means operatively connected indirectly with said reciprocating machine member for being actuated depending upon a predetermined amount of movement of said member during its work stroke; delayed action relay means energizable by actuation of said pilot switch means and interrupting after a predetermined delay said fourth one of said parallel circuits containing one of said relay coils so as to cause deenergization of said electrically operable control means, and closing, when energized, said special relay contact for a predetermined brief period of time so as to energize briefly said indicator means causing it to insure a signal indicatng that said control means are in idle position and that the entire circuit is in condition for normal operation; and primary control switch means comprising two series-connected switches for simultaneous two-hand control and connected to said source and to at least one of said relay coils and cooperating with all of said series-connected relay switch means in said first circuit means for causing the same to be in conductive condition so as to start operation of the machine.

References Cited by the Examiner

UNITED STATES PATENTS 3,183,377  5/1965  Holland _____ 307—113

NEIL C. READ, *Primary Examiner.*

D. YUSKO, *Assistant Examiner.*